(12) United States Patent
Kellum

(10) Patent No.: US 9,150,104 B2
(45) Date of Patent: Oct. 6, 2015

(54) VEHICLE STEERING-BASED SPEED CONTROL SYSTEM AND METHOD

(71) Applicant: Deere & Company, Moline, IL (US)

(72) Inventor: Carroll C. Kellum, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 417 days.

(21) Appl. No.: 13/663,718

(22) Filed: Oct. 30, 2012

(65) Prior Publication Data

US 2014/0121931 A1 May 1, 2014

(51) Int. Cl.
*B60T 8/32* (2006.01)
*B60K 28/10* (2006.01)
*B60W 30/02* (2012.01)
*F16H 59/36* (2006.01)
*B60W 10/06* (2006.01)
*B60W 10/14* (2012.01)
*B60W 10/16* (2012.01)
*B60W 10/184* (2012.01)

(52) U.S. Cl.
CPC ............... *B60K 28/10* (2013.01); *B60W 10/06* (2013.01); *B60W 10/14* (2013.01); *B60W 10/16* (2013.01); *B60W 10/184* (2013.01); *B60W 30/02* (2013.01); *F16H 59/36* (2013.01); *B60W 2520/125* (2013.01); *B60W 2520/14* (2013.01); *B60W 2540/18* (2013.01); *B60W 2550/402* (2013.01); *B60W 2710/0666* (2013.01); *B60W 2710/1005* (2013.01); *B60W 2710/125* (2013.01); *B60W 2720/10* (2013.01); *B60W 2720/14* (2013.01); *B60W 2720/403* (2013.01); *B60W 2720/406* (2013.01)

(58) Field of Classification Search
CPC ....... B60K 28/10; F16H 59/36; B60W 10/06; B60W 10/14; B60W 10/184; B60W 10/16; B60W 30/02; B60W 2710/125; B60W 2520/125; B60W 2520/14; B60W 2540/18; B60W 2720/403; B60W 2720/406; B60T 8/58
USPC ......... 701/90, 83, 84, 93, 31.4, 468; 180/197; 303/140
See application file for complete search history.

(56) References Cited

U.S. PATENT DOCUMENTS

| | | | | | |
|---|---|---|---|---|---|
| 4,763,262 | A | * | 8/1988 | Leiber | 701/90 |
| 4,779,202 | A | * | 10/1988 | Leiber | 701/90 |
| 5,018,595 | A | * | 5/1991 | Hara et al. | 180/197 |
| 5,473,231 | A | * | 12/1995 | McLaughlin et al. | 318/433 |
| 5,568,389 | A | * | 10/1996 | McLaughlin et al. | 701/41 |
| 5,612,879 | A | * | 3/1997 | Makino | 701/70 |
| 5,857,160 | A | * | 1/1999 | Dickinson et al. | 701/41 |
| 5,948,029 | A | | 9/1999 | Straetker | |
| 6,132,332 | A | * | 10/2000 | Yasui | 477/36 |
| 2010/0209887 | A1 | * | 8/2010 | Chin et al. | 434/65 |

OTHER PUBLICATIONS

John Deere Guidance Systems (22 pages).

* cited by examiner

*Primary Examiner* — Gertrude Arthur Jeanglaude

(57) ABSTRACT

A control system and method is provided for a vehicle. The control system includes a speed sensor, a wheel angle sensor, and a vehicle position sensor. An electronic control unit (ECU) determines a yaw-rate error as a function of at least the vehicle position signal, determines a first speed limit as a function of the yaw-rate error, determines a second speed limit as a function of a vehicle lateral acceleration, and determines a third speed limit as a function of the wheel angle signal. The ECU selects the lowest of the first, second and third speed limits, generates a front wheel drive command and a diff lock command as a function of the wheel angle signal. The ECU also limits the vehicle speed to not greater than the selected lowest wheel speed limit.

18 Claims, 4 Drawing Sheets

VEHICLE STEERING-BASED SPEED CONTROL SYSTEM AND METHOD

FIELD

The present disclosure relates to a method and system for controlling a vehicle.

BACKGROUND

When making a turn with a vehicle such as an agricultural tractor, the operator must slow the vehicle down in order to avoid high sideslip in field conditions. Slowing a vehicle down may be challenging as the transmission response may be fast and invoke jerky behavior depending on the operator's skill level and the implements attached. The task of slowing a vehicle down usually involves the use of a hand or foot. An automated system would free up that extremity for other tasks.

The "iTEC Pro" automatic steering and the implement management system is available for certain John Deere tractors. This system controls tractor speed, raise front and rear mounted implements, and controls power take-off (PTO), selective control valves, mechanical front wheel drive and differential lock engagement. This system enables hands free turns at every headland, reducing headland skips and overlaps. iTEC Pro allows an operator to enter a fixed wheel speed to be used throughout automated turns.

SUMMARY

A control system and method is provided for a vehicle having an engine supplying torque to a transmission which supplies torque to driven wheels through an electronically controlled differential lock ("diff lock") unit, an electronically controlled front wheel drive control unit which is actuatable to transmit torque from the transmission to steerable front wheels, and a transmission electronic control unit (ECU) for controlling the transmission. The control system includes a speed sensor generating a vehicle speed signal, a wheel angle sensor generating a wheel angle signal which represents an angle of the steered wheels, and a vehicle position sensor generating a vehicle position signal.

A main ECU is connected to the speed sensor, to the wheel angle sensor, to the vehicle position sensor, and to the transmission ECU. The main ECU determines a yaw-rate error as a function of at least the vehicle position signal, determines a first speed limit as a function of the yaw-rate error, determines a second speed limit as a function of a vehicle lateral acceleration, and determines a third speed limit as a function of the wheel angle signal. The main ECU selects the lowest of the first, second and third speed limits, and generates a front wheel drive command as a function of the wheel angle signal, generates a diff lock command as a function of the wheel angle signal, and transmits to the transmission ECU the selected speed limit, the front wheel drive command and the diff lock command. The transmission ECU, in response to the selected speed limit, the front wheel drive command and the diff lock command, controls engagement of the front wheel drive unit, controls the differential lock unit, and controls the transmission so that the vehicle speed is not greater than the selected lowest wheel speed limit.

The main ECU sets the front wheel drive command to ON if the wheel angle signal is within a certain range of a maximum angle, and sets the front wheel drive command to OFF if the wheel angle signal is not within a certain range of the maximum angle. The main ECU sets the diff lock command to OFF if the wheel angle signal is greater than a threshold wheel angle, and sets the diff lock command to ON if the wheel angle signal is not greater than a threshold wheel angle.

DETAILED DESCRIPTION OF THE DRAWINGS

Figure 1:
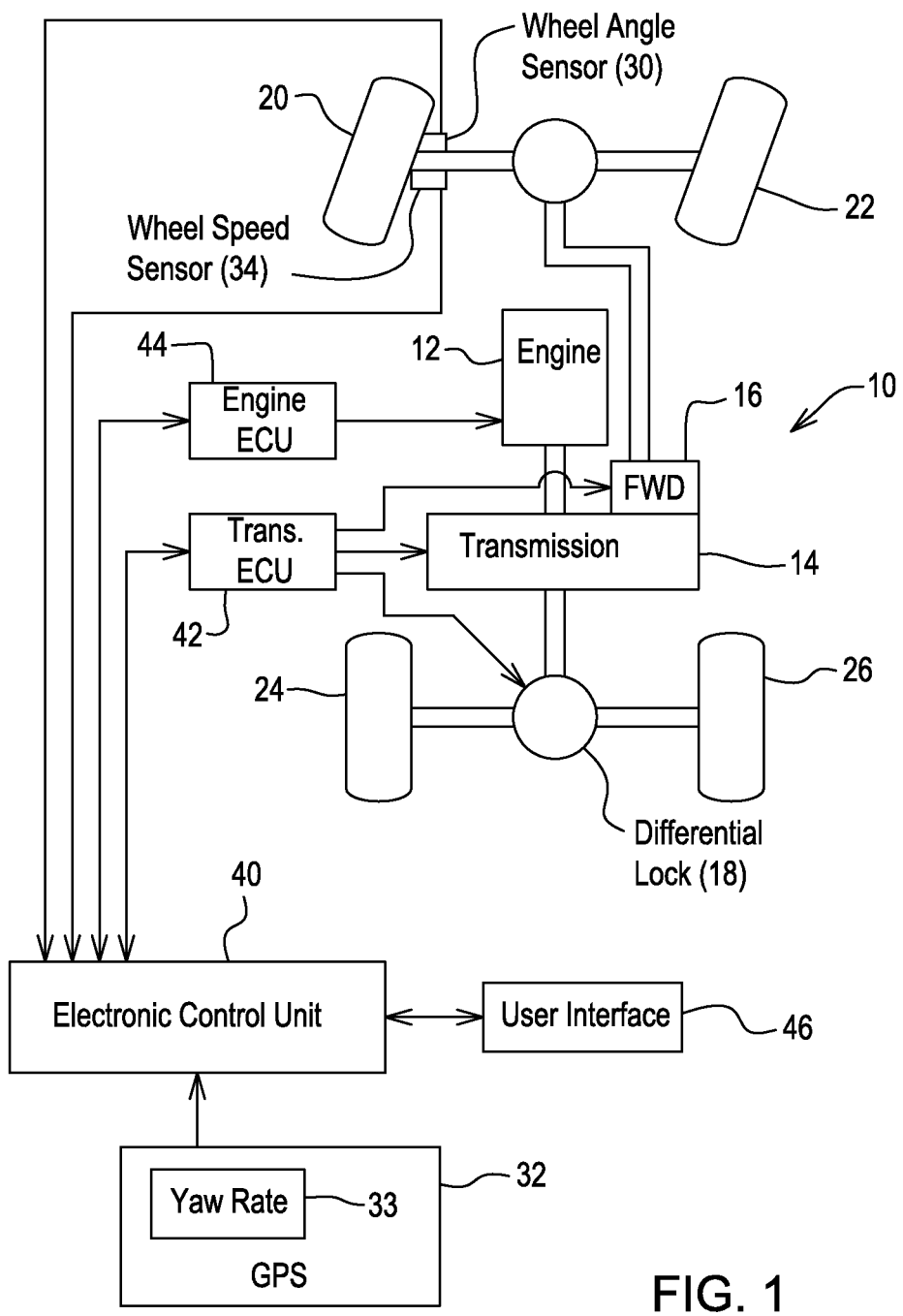
FIG. 1 is a simplified schematic diagram of a vehicle and a control system embodying the invention.
Figure 2:
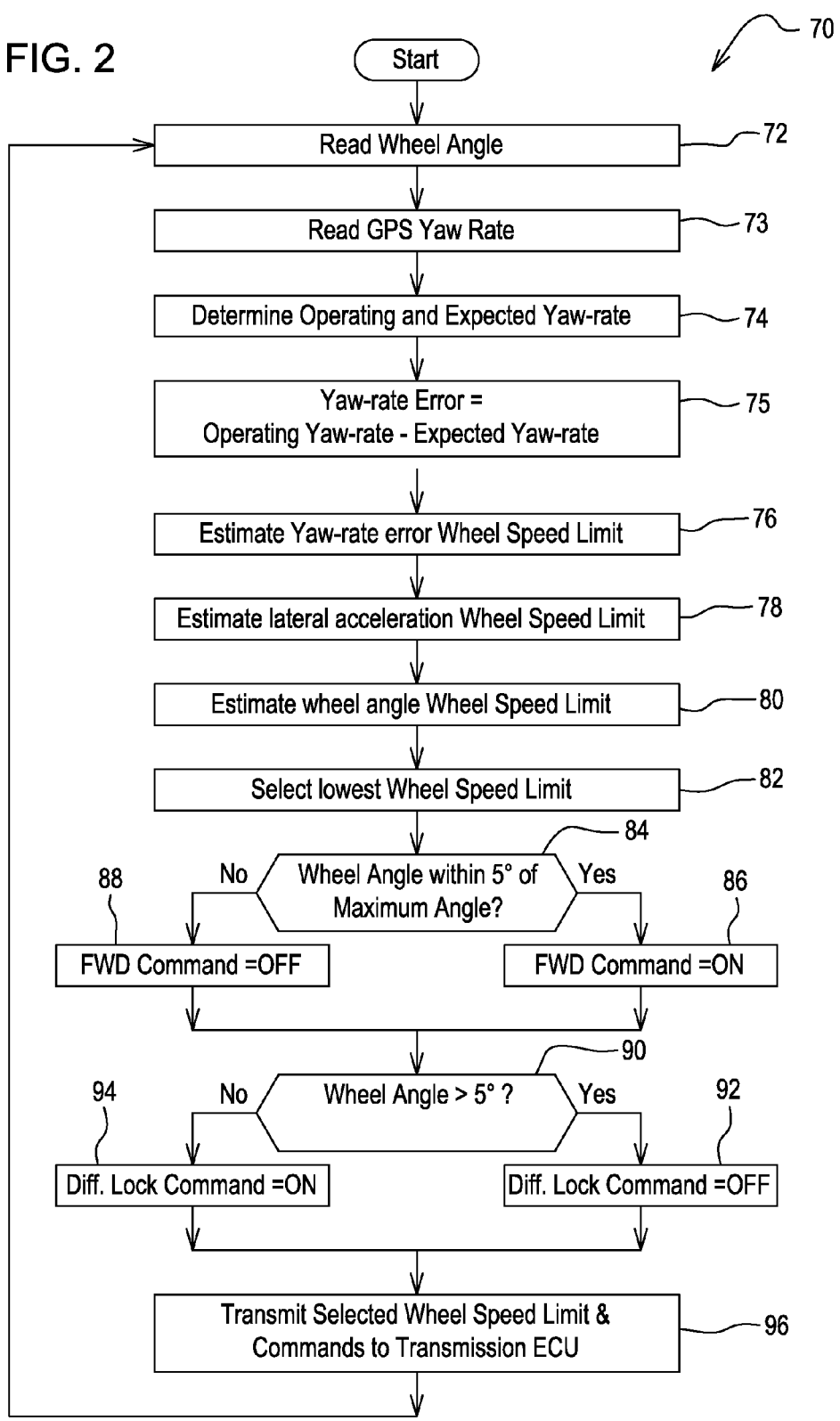
FIG. 2 is a flow chart of an algorithm performed by the control system of FIG. 1.

Referring to FIG. 1, a vehicle 10 includes an engine 12 which drives a transmission 14. The transmission 14 includes an electronically controlled front wheel drive control unit 16 and an electronically controlled differential lock control unit 18. The front wheel drive control unit 16 is coupled to steerable front wheels 20, 22. When the front wheel drive control unit 16 is on, torque is transmitted from the transmission to the front wheels 20, 22. When the front wheel drive control unit 16 is off, torque is not transmitted from the transmission to the front wheels 20, 22. Alternatively, the engine and the transmission could be replaced by other known vehicle propulsion systems, such as electric propulsion.

The differential lock (diff lock) control unit 18 is coupled to driven rear wheels 24, 26. When the differential lock control unit 18 is unlocked (off, open differential), it allows each of the rear wheels 24, 26 to rotate at different speeds, such as when negotiating a turn. By contrast, when the differential lock control unit 18 is on or locked, it forces both left and right wheels on the same axle to rotate at the same speed under nearly all circumstances.

A wheel angle sensor 30 senses the angular position of the wheels 20 and 22. A GPS unit 32, such as a Jon Deere StarFire 3000 receiver, provides a vehicle position signal. A wheel speed sensor 34 provides a wheel speed signal.

A main electronic control unit (ECU) 40 is connected to the wheel angle sensor 30, the GPS unit 32 and the wheel speed sensor 34. The ECU 40 communicates with a transmission ECU 42 and with an engine ECU 44. Transmission ECU 42 controls the transmission 14 and provides control signals to the front wheel drive control unit 16 and to the differential lock control unit 18. The engine ECU 44 controls the engine 12. A user interface 46 is connected to the main ECU 40. The GPS unit 32 is a conventional GPS unit and includes an inertial yaw rate sensor 33 which provides a yaw rate signal.

Figure 3:
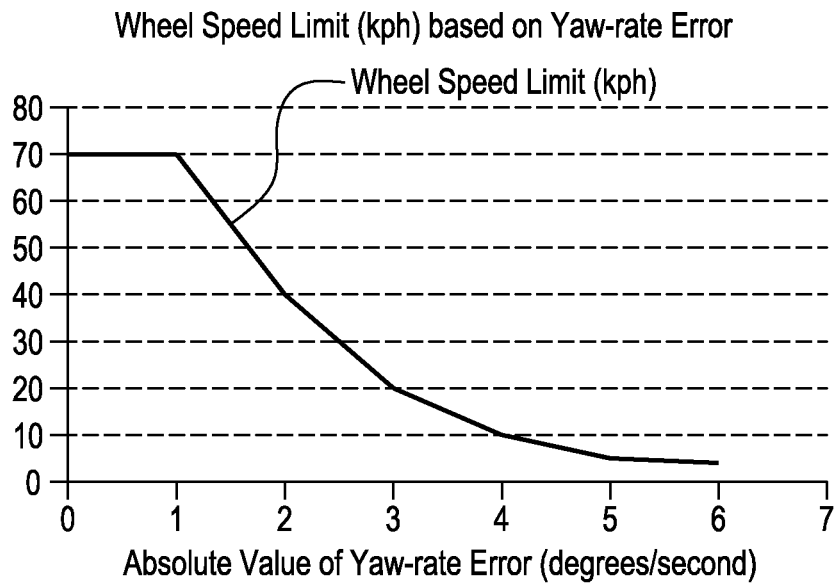
FIG. 3 is graphical representation of a stored Wheel Speed Limit versus Yaw-rate Error relationship.

The main ECU 40 is programmed to perform the algorithm 70 or method steps shown in FIG. 3. At step 72, the ECU reads the wheel angle from the wheel angle sensors 28 and 30.

In step 73, the ECU 40 reads the vehicle position and heading from the GPS unit 32.

In step 74, the ECU 40 determines an Operating yaw-rate and an Expected yaw-rate. ECU 40 determines the Operating yaw-rate by from the yaw-rate sensor 33, or by differentiating the heading from GPS unit 32. Yaw-rate is the change in yaw angle. The commercially available John Deere StarFire 3000 receiver currently provides such signals.

The ECU 40 determines the Expected yaw-rate by using sensed wheel speed and wheel angle to look-up the Expected yaw-rate from stored calibration data. This stored calibration data is preferably determined by a slide-slip calibration process wherein the vehicle is driven in circles of varying radii at varying speeds on a hard surface with good traction. During this, data is collected and a relationship of wheel angle versus wheel speed (or GPS speed) versus yaw-rate is determined.

In step 75 the ECU 40 determines a Yaw-rate error by subtracting the Expected yaw-rate from the Operating yaw-rate.

In step 76, the ECU 40 determines a wheel speed limit based on the yaw-rate error. This Wheel Speed Limit is determined from a stored relationship, such as is illustrated by FIG. 3.

Figure 4:
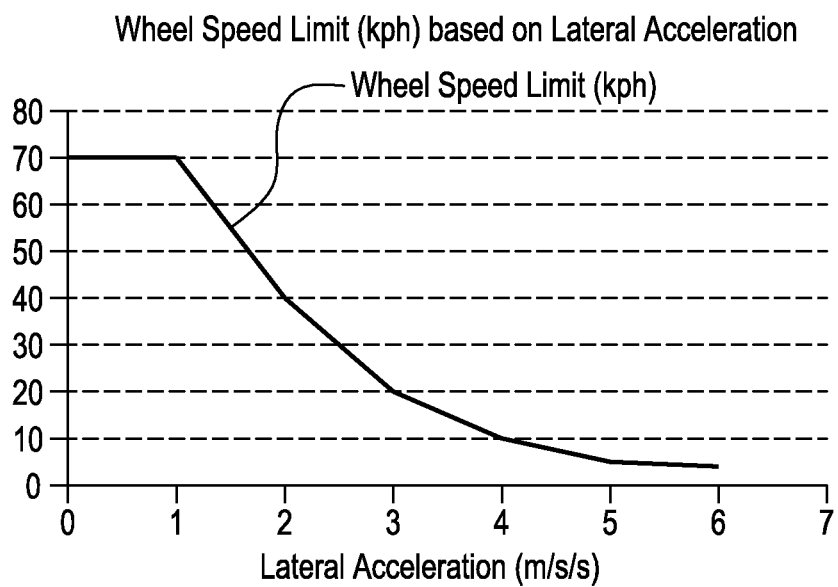
FIG. 4 is graphical representation of a stored Wheel Speed Limit versus lateral acceleration relationship.

Next, in step 78, an estimated lateral acceleration Wheel Speed Limit is determined. This may be determined as follows. First, an estimated lateral acceleration is determined, where estimated lateral acceleration=yaw-rate X speed. Then, the Wheel Speed Limit based on lateral acceleration is determined from a look-up table or a stored relationship illustrated by FIG. 4.

Figure 5:
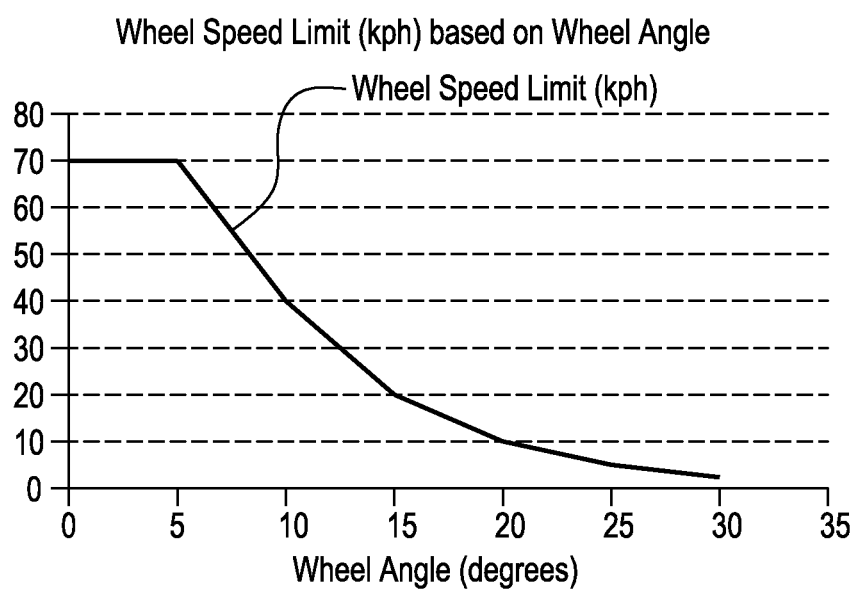
FIG. 5 is graphical representation of a stored Wheel Speed Limit versus wheel angle relationship.

Next, in step 80 a wheel angle speed limit is determined from a look-up table or a stored relationship such as illustrated by FIG. 5.

Next, step 82 selects the lowest of the speed limit values determined by steps 76-80. The selected speed limit value is transmitted to the transmission ECU 42, and the ECU 42 operates to adjust the transmission so that the speed of the vehicle is not greater than the selected speed limit.

Next, in step 84 the sensed wheel angle is compared to a maximum angle value. If the wheel angle is within a certain range (such as 5 degrees) of the maximum angle, then step 86 sets a front wheel drive command equal to ON. If the wheel angle is not within a certain range (such as 5 degrees) of the maximum angle, then step 88 sets a front wheel drive command equal to OFF.

Next, step 90 directs the algorithm to step 92 if the wheel angle is greater than a certain threshold (such as 5 degrees), else to step 94. Step 92 sets a diff lock command to OFF, while step 94 sets the diff lock command to ON.

Step 96 then transmits to the transmission ECU 42 the selected lowest wheel speed limit from step 82, the front wheel drive command from either step 86 or 88, and the diff lock command from either step 92 or 94. In response, the transmission ECU 42 engages the front wheel drive unit 16 if the front wheel drive command is ON, disengages the front wheel drive unit 16 if the front wheel drive command is OFF, turns the diff lock 18 off if the diff lock command is OFF, turns the diff lock 18 on if the diff lock command is ON, and controls the transmission 14 so that the vehicle speed is not greater than the selected lowest wheel speed limit.

Following step 96, the algorithm returns to step 72.

The conversion of the above flow chart into a standard language for implementing the algorithm described by the flow chart in a digital computer or microprocessor will be evident to one with ordinary skill in the art.

With this system, as the steered wheels 20, 22 are turned for a headland turn, the vehicle automatically reduces speed for comfort and sideslip control. When a steering action is taken by the operator or an autonomous system, the vehicle speed is automatically controlled in order to improve the turn experience and to improve operator comfort during the turn, and so that the operator does not the task of manually reducing the speed. Additionally, the speed is controlled in order to limit the sideslip of the vehicle if the front wheels are sliding.

Closed-loop can be applied to wheel speed and estimated sideslip. As sideslip increases, the wheel speed can be reduced to improve traction. The operator could be provided with controls permitting adjustment of the relationship between steering angle (or wheel angle) and speed, and/or the relationship between sideslip and speed. Controls could also be provided to control how quickly the vehicle slows down or speeds up in response to the beginning or ending of a steering action. This system is useful primarily during field work, since the steering angles in transport are small and more time may be necessary between slowing down and entering a curve with a heavy trailer.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims. For example, based on a stored path plan, an automated system could predict the wheel angle or lateral acceleration through a turn and automatically calculate a desirable wheel speed and control to that wheel speed. In this case, the wheel speed calculation would be performed in advance and the control of wheel speed would not lag the sensor readings. This type of system could not perform closed-loop sideslip control.

I claim:

1. A control system for a vehicle having a propulsion system supplying torque to driven wheels, and an electronic control unit (ECU), the control system comprising:
    a speed sensor generating a vehicle speed signal;
    a wheel angle sensor generating a wheel angle signal which represents an angle of the steered wheels; and
    a vehicle position sensor generating a vehicle position signal, the ECU determining an expected yaw-rate as a function of the wheel angle signal and the vehicle speed signal, the ECU determining a yaw-rate error as a function of a difference between the vehicle position signal and the expected yaw-rate, determining a speed limit as a function of the yaw-rate error, and in response to the speed limit, and controlling the propulsion system so that the vehicle speed is not greater than the speed limit.

2. The control system of claim 1, wherein:
    the ECU determines the yaw-rate error as a function of at least the vehicle position signal, determines a first speed limit as a function of the yaw-rate error, determines a second speed limit as a function of a vehicle lateral acceleration, determines a third speed limit as a function of the wheel angle signal, selecting the lowest of the first, second and third speed limits, and in response to the selected speed limit, controlling the transmission so that the vehicle speed is not greater than the selected lowest speed limit.

3. The control system of claim 1, wherein:
    the electronically controlled transmission supplies torque to the driven wheels through an electronically controlled differential lock unit;
    an electronically controlled front wheel drive control unit is actuatable to transmit torque from the transmission to steerable front wheels; and
    the ECU generating a front wheel drive command as a function of the wheel angle signal, generating a diff lock command as a function of the wheel angle signal, and transmitting to the ECU the selected speed limit, the front wheel drive command and the diff lock command, the ECU, in response to the selected speed limit, the front wheel drive command and the diff lock command, controlling engagement of the front wheel drive unit, controlling the differential lock unit, and controlling the transmission.

4. The control system of claim 3, wherein:
the ECU sets the front wheel drive command to ON if the wheel angle signal is within a certain range of a maximum angle, and sets the front wheel drive command to OFF if the wheel angle signal is not within a certain range of the maximum angle.

5. The control system of claim 3, wherein:
the ECU sets the diff lock command to OFF if the wheel angle signal is greater than a threshold wheel angle, and sets the diff lock command to ON if the wheel angle signal is not greater than a threshold wheel angle.

6. A control system for a vehicle having an engine supplying torque to a transmission which supplies torque to driven wheels through an electronically controlled differential lock unit, an electronically controlled front wheel drive control unit which is actuatable to transmit torque from the transmission to steerable front wheels, and an electronic control unit (ECU), the control system comprising:
a speed sensor which transmits a vehicle speed signal to the ECU;
a wheel angle sensor which transmits a wheel angle signal which represents an angle of the steered wheels to the ECU;
a vehicle position sensor generating a vehicle position signal;
the ECU determining a yaw-rate error as a function of at least the vehicle position signal, determining a first speed limit as a function of the yaw-rate error, determining a second speed limit as a function of a vehicle lateral acceleration, determining a third speed limit as a function of the wheel angle signal, selecting the lowest of the first, second and third speed limits, generating a front wheel drive command as a function of the wheel angle signal, generating a diff lock command as a function of the wheel angle signal, and, in response to the selected speed limit, the front wheel drive command and the diff lock command, controlling engagement of the front wheel drive unit, controlling the differential lock unit, and controlling the transmission so that the vehicle speed is not greater than the selected lowest speed limit.

7. The control system of claim 6, wherein:
the ECU sets the front wheel drive command to ON if the wheel angle signal is within a certain range of a maximum angle, and sets the front wheel drive command to OFF if the wheel angle signal is not within a certain range of the maximum angle.

8. The control system of claim 6, wherein:
the ECU sets the diff lock command to OFF if the wheel angle signal is greater than a threshold wheel angle, and sets the diff lock command to ON if the wheel angle signal is not greater than a threshold wheel angle.

9. The control system of claim 6, wherein:
the ECU determines an operating yaw-rate and an expected yaw-rate; and
the ECU determines a yaw-rate error by subtracting the expected yaw-rate from the operating yaw-rate.

10. The control system of claim 9, wherein:
the ECU determines the operating yaw-rate by differentiating a signal from a GPS unit.

11. A method of controlling a vehicle having an engine supplying torque to a transmission which supplies torque to driven wheels, and an electronic control unit (ECU) for controlling the transmission, the method comprising:
sensing vehicle speed and generating a vehicle speed signal;
sensing a steered wheel angle and generating a wheel angle signal;
sensing a vehicle position and generating a vehicle position signal;
determining a yaw-rate error as a function of at least the vehicle position signal;
determining a first speed limit as a function of the yaw-rate error;
determining a second speed limit as a function of a vehicle lateral acceleration;
determining a third speed limit as a function of the wheel angle signal;
selecting a lowest of the first, second and third speed limits; and
in response to the selected speed limit, controlling the transmission so that the vehicle speed is not greater than the selected lowest speed limit.

12. The method of claim 11, further comprising:
supplying torque from the transmission to the driven wheels through an electronically controlled differential lock unit;
transmitting torque from the transmission to the steerable front wheels through an electronically controlled front wheel drive control unit;
generating a front wheel drive command as a function of the wheel angle signal;
generating a diff lock command as a function of the wheel angle signal; and
in response to the selected speed limit, the front wheel drive command and the diff lock command, controlling engagement of the front wheel drive unit and controlling the differential lock unit.

13. The method of claim 11, further comprising:
determining an operating yaw-rate by differentiating the vehicle position signal;
determining an expected yaw-rate as a function of sensed wheel speed, sensed wheel angle and stored calibration data; and
determining the yaw-rate error by subtracting the expected yaw-rate from the operating yaw-rate.

14. A method of controlling a vehicle having an engine supplying torque to a transmission which supplies torque to driven wheels through an electronically controlled differential lock unit, an electronically controlled front wheel drive control unit which is actuatable to transmit torque from the transmission to steerable front wheels, and a transmission electronic control unit (ECU) for controlling the transmission, the method comprising:
determining a yaw-rate error as a function of sensed parameters;
determining a first speed limit as a function of the yaw-rate error;
determining at least a second speed limit as a function of a vehicle lateral acceleration;
selecting the lowest of at least the first and second speed limits; and
in response to the selected speed limit, controlling the transmission so that the vehicle speed is not greater than the selected lowest speed limit.

15. A control system for a vehicle having a propulsion system supplying torque to driven wheels through an electronically controlled differential lock unit, an electronically controlled front wheel drive control unit which is actuatable to transmit torque to steerable front wheels, and an electronic control unit (ECU), the control system comprising:
- a speed sensor connected to the ECU and generating a vehicle speed signal;
- a wheel angle sensor connected to the ECU and generating a wheel angle signal which represents an angle of the steered wheels;
- a vehicle position sensor connected to the ECU and generating a vehicle position signal;
- the ECU determining a yaw-rate error as a function of at least the vehicle position signal, determining a first speed limit as a function of the yaw-rate error, determining a second speed limit as a function of a vehicle lateral acceleration, determining a third speed limit as a function of the wheel angle signal, selecting the lowest of the first, second and third speed limits, generating a front wheel drive command as a function of the wheel angle signal, generating a diff lock command as a function of the wheel angle signal, the ECU, in response to the selected speed limit, the front wheel drive command and the diff lock command, controlling engagement of the front wheel drive unit, controlling the differential lock unit, and controlling the transmission so that the vehicle speed is not greater than the selected lowest speed limit.

16. The control system of claim 15, wherein:
the ECU sets the front wheel drive command to ON if the wheel angle signal is within a certain range of a maximum angle, and sets the front wheel drive command to OFF if the wheel angle signal is not within a certain range of the maximum angle.

17. The control system of claim 15, wherein:
the ECU sets the diff lock command to OFF if the wheel angle signal is greater than a threshold wheel angle, and sets the diff lock command to ON if the wheel angle signal is not greater than a threshold wheel angle.

18. A control system for a vehicle having an engine supplying torque to a
- an electronically controlled transmission which supplies torque to driven wheels, and
- an electronic control unit (ECU), the control system comprising:
  - a speed sensor generating a vehicle speed signal;
  - a wheel angle sensor generating a wheel angle signal which represents an angle of the steered wheels; and
  - a vehicle position sensor generating a vehicle position signal, the ECU determining an expected yaw-rate as a function of the wheel angle signal and the vehicle speed signal, the ECU determining a yaw-rate error as a function of a difference between the vehicle position signal and the expected yaw-rate, determining a speed limit as a function of the yaw-rate error, and in response to the speed limit, controlling the transmission so that the vehicle speed is not greater than the speed limit.

* * * * *